United States Patent

[11] 3,620,751

| [72] | Inventors | Miroslav Stol;<br>Richard Chromecek; Vladimir Stoy; Karel Kliment; Jaroslava Otoupalova, all of Prague, Czechoslovakia |
|---|---|---|
| [21] | Appl. No. | 736,280 |
| [22] | Filed | June 12, 1968 |
| [45] | Patented | Nov. 16, 1971 |
| [73] | Assignee | Ceskoslovenska akademie ved<br>Prague, Czechoslovakia |
| [32] | Priority | June 21, 1967 |
| [33] | | Czechoslovakia |
| [31] | | 4540/67 |

[54] PHOTOGRAPHIC LIGHT-SENSITIVE LAYERS CONTAINING POLYMER OF POLYOL ESTER OF $\alpha,\beta$-UNSATURATED ACID
6 Claims, No Drawings

| [52] | U.S. Cl. | 96/114 |
|---|---|---|
| [51] | Int. Cl. | G03c 1/72 |
| [50] | Field of Search | 96/114 |

[56] References Cited
UNITED STATES PATENTS

| 3,167,430 | 1/1965 | Lohmer et al. | 96/114 |
|---|---|---|---|
| 3,113,026 | 12/1963 | Sprung | 96/114 |
| 3,291,611 | 12/1966 | Krajewski | 96/114 |
| 3,079,257 | 2/1963 | Morcher et al. | 96/114 |

*Primary Examiner*—Norman G. Torchin
*Assistant Examiner*—Edward C. Kimlin
*Attorney*—Richard Low

ABSTRACT: Usual gelatine is replaced in light-sensitive photographic layers on films, paper, glass and other substrates by noncrosslinked polymers and copolymers of polyol, particularly glycol methacrylates or acrylates or their mixtures, soluble in aqueous cosolvent mixtures but insoluble in water, in which they but swell. According to a special embodiment, said polymers or copolymers are grafted onto gelatine. According to a further embodiment of the invention, silver halides are precipitated directly in said polymers or copolymers grafted on gelatine in cosolvent aqueous mixtures, the suspension thus obtained is precipitated and washed in excess of water, whereafter the purified polymer-silver halide suspension is dissolved and dispersed again in an aqueous cosolvnet mixture, the liquid dispersion is cast onto a solid substrate and the solvent evaporated. According to a still further embodiment the silver halide is first precipitated in an aqueous gelatine solution, separated and dispersed in a solution of a noncrosslinked polymer or copolymer of glycol acrylate or methacrylate, whereafter the dispersion is used for casting light-sensitive layers.

PHOTOGRAPHIC LIGHT-SENSITIVE LAYERS CONTAINING POLYMER OF POLYOL ESTER OF $\alpha,\beta$-UNSATURATED ACID

GENERAL DISCLOSURE

The most employed binding material for manufacturing photographic light-sensitive layers, particularly such containing silver halides, is genuine gelatine. Gelatine meets two basic requirements: It forms a protective colloid, controlling size and dispersion of silver halide grains which are usually precipitated directly in gelatine solutions. Furthermore, gelatine is a very effective light-sensibilizer, forming by its sulfur-containing components like cystine and cysteine active centers in silver halide crystals. This is one of reasons why e.g. silver bromide possesses a light-sensitivity which is about 10,000 times higher than the value derived from the Einstein's law of the photochemical effect of light. Another favorable property which, however, is not specific for gelatine, is its high permeability for ions and small molecules in water-swollen condition.

Genuine gelatine has, however, no uniform composition. As a result thereof, the photochemical properties vary in an unforseeable way, depending also on the sort of raw material and technologic conditions of the manufacture. It is therefore usual to blend several sorts of gelatine and to adjust the composition of the photographic emulsions according to empirical tests. Nevertheless, the quality of the photogelatine in individual batches is often different. Moreover, there is increasing shortage of high-grade photographic gelatine due to steeply increasing production of light-sensitive material so that it must be partly replaced or even adulterated with lower grade sorts thereof.

Many efforts have been made in the past to replace genuine gelatine by a synthetic material with definite and uniform properties and unlimited possibility of production. Among other materials many synthetic polymers have been proposed as substitutes for photographic gelatine, such as polyvinyl acetate and other polyvinylalcohol esters, polyvinyl alcohol containing unsaponified acetate groups, obtained by uncomplete saponification of polyvinyl acetate, copolymers of alifatic mono-olefines with vinyl esters, polyamides, polyaminotriazols and polyethyleneimine. Semisynthetic polymers such as collodion are also used for certain special purposes. Photosensitive layers containing said polymers were also sensibilized e.g. by means of thiocyanate solutions. There is, however, known no satisfactory substitute for photographic gelatine, meeting all high requirements.

Polymeric substance which could be utilizable as substitute of high-grade gelatine has to be soluble to highly viscous, easily applicable solutions. Furthermore, it has to be a good protective colloid and to be compatible with all constituents of photosensitive layers. This means that there must exist a common solvent or solvent mixture for all constituents except the silver halide which is only dispersed in the polymer solution. Moreover, the polymer must not influence adversely the formation of the silver halide crystals. A useful substitute for photographic gelatine must be neither water-soluble nor susceptible to be adversely affected or deteriorated by solutions of reagents used for treating photographic material, nor to interfere with the photochemical process involved. The pH-value, which is an important factor in the process of forming silver halide photosensitive grains, must not be changed in undesirable manner, and the polymer must not possess any reductive effect on silver halide at usual conditions. A useful binder for photosensitive material should be also capable of being subsequently cross-linked, and in any case to resist temperatures of a tropical climate. A good permeability for water, inorganic ions and organic substances used in the developing processes is also necessary. Good gelatine substitute has to be fairly film-forming and to yield well adhering, elastic, transparent and fully homogeneous films.

It is an object of the invention to prepare photosensitive layers containing, as a binder, water swellable but water-insoluble polymers and copolymers of esters of acrylic and methacrylic acid with alcohols having at least two hydroxilic groups, such as ethylene and polyethylene glycols, 1,3-propylene glycol and 1,4-butylene glycol, glycerol, substituted water soluble glycols such as 1,2-propylene glycol, and other polyols such a mannitol, sorbitol, pentaerithritol and similar, said polymers having substantially noncrosslinked structure and being soluble in solvents or solvent mixtures which can be subsequently removed by evaporation or extraction. The term "copolymers" involves all kinds of copolymers, i.e. statistic copolymers, with other monomers, such as with vinyl esters and alkyl esters or amides of acrylic and methacrylic acid, acrylonitrile, methacrylonitrile and similar, further copolymers of the above said mono-olefinic esters of acrylic and methacrylic acid with glycols and other polyols grafted on natural or synthetic polymers and copolymers such as gelatine, starch, carboxymethyl cellulose, polyvinylalcohol, copolymers of acrylamide or methacrylamide with acrylic or methacrylic acid or with their esters respectively and also so called block or sequence copolymers of such polymers: Sequence copolymers differ from grafted copolymers in which the branches of polyol acrylates or methacrylates are growing from different sites of the basic macromolecule-forming side branches of different length, while in sequence copolymers such branches grow only from the ends of the basic polymer, forming substantially linear macromolecules with alternating blocks or sequences of the two constituents.

Particularly the grafted copolymers of the above-mentioned kind possess some very advantageous properties: If, e.g., ethylene glycol monomethacrylate, containing usually a minor amount of ethylene glycol bis-methacrylate, is grafted onto gelatine, the latter becomes water-insoluble. It is, however, soluble in aqueous cosolvent mixtures such as methanol-glycerol-water (2:1:1) or acetone-water (2:1) and the solutions can be cast onto even surfaces and form, after evaporating the solvents, elastic, transparent films. Glycerol, acting also as a plasticizer, can be replaced by ethylene glycol, ethylene glycol monoacetate, glycerol diacetates and similar. Said grafted copolymers are very well compatible with silver halides, which can be precipitated in their solution forming a good protective colloid. Even a rather small content of gelatine provides sufficient sensibilization of the silver halide. The swelling capacity of the grafted copolymer depends on the gelatine content and can be thus easily varied. The obtained films are highly permeable for ions and small molecules so that the chemical processes during the developing and fixing operations take place very smoothly and rapidly.

The grafting onto gelatine is convenient since the glycol methacrylate homopolymer or analogous homopolymers simultaneously formed need not to be removed, their physical properties being close to that of the grafted copolymer. The ability of gelatine for being grafted by said kind of hydrophilic monomers such as glycol methacrylate is so high that all gelatine is grafted if at least 50 percent of glycol methacrylate or similar is present. There remains no water-soluble portion of gelatine.

New materials according to the invention can be used in whole field of applied photography and cinematography, for negative, positive and inversion photosensitive materials such as papers, films, plates for both black-and-white and color process. They are particularly suitable for instantaneously developing automatic photographic cameras, due to the very high permeability of the glycol methacrylate and similar polymers and copolymers. Photosensitive layers with said binders can be also used for special photographic material such as for X-ray pictures. Easy blending and forming copolymers with different monomers and polymers gives to anybody skilled in the art a highly desirable possibility of adjusting the properties of the photosensitive layer to any purpose. The main properties which can be influenced by either blending or by copolymerization or by both of them are: Swelling capacity in aqueous liquids having different pH value, resistance at increased temperatures, permeability for different substances, film-forming properties, compatibility with silver halides and other constituents of photosensitive layers.

Cosolvent mixtures are formulated according to known rules, using mutually miscible good solvents for all constituents of the blend or of the copolymer used. Poor solvents cause sometimes opacity or at least reduced transparency for visible light, the macromolecular chains or their side branches respectively being insufficiently unfolded. It is also necessary to avoid substrate films with such plasticizers which can penetrate into the photosensitive layer prior to evaporation of the solvent and which are incompatible with the polyolmethacrylate or polyolacrylate polymer. The solvents used must not contain impurities which would be liable to induce undesirable reduction-oxidation and other processes.

Photographic "emulsions," i.e. dispersions of a silver halide in solutions of the above said polymers, can be prepared in different ways. One of them consists in forming silver bromide precipitate in the lowest necessary amount of a solution of genuine high-grade photogelatine, heating to a temperature not exceeding 60° C., at which the viscosity is greatly decreased, seperating the silver halide by means of a centrifuge, washing it with warm distilled water, if desired, and stirring it into a solution of a polyolmethacrylate or polyolacrylate polymer, e.g. into a solution of a noncrosslinked ethylene glycol polymer of the kind disclosed in our Czechoslovakian Pat. No. 124.819 in aqueous ethanol or in aqueous acetone. The polymer solution has such viscosity that grains of silver halide do not set to the bottom during casting and evaporating of the solvent.

Another way consists in mixing the silver halide grains with the polymer solution without removing first the gelatine. In this case the solvent of the polyol acrylate or methacrylate is to be chosen so as to avoid any optical inhomogeneity of the film thus obtained; Suitable cosolvent mixture is e.g. acetone-water or methanol-glycerol-water as mentioned above for grafted gelatine.

Still another way consists in preparing silver halide in a solution of gelatine grafted with major amount of polyol acrylate or polyolmethacrylate instead of in a pure gelatine solution. The proportion of the gelatine is chosen so that the silver halide is sufficiently sensibilized by sulfur-containing constituents of gelatine. The share of the polyolacrylate or methacrylate can exceed 80 weight percent. In this case the preparation of the photosensitive layer is similar to the usual method using gelatine, except the solvent.

Still another possibility is to prepare silver halide suspension in a minor amount of high-grade photographic gelatine solution, to solidify the gelatine solution by chilling, to wash the comminuted silver-halide-containing gelatine in usual way and to dissolve it in an aqueous cosolvent mixture containing a suitable polyolacrylate or methacrylate monomer. The suspension is then initiated with suitable polymerization catalyst and the monomer is grafted on the gelatine so that a suspension of silver halide in a solution of grafted copolymer results. If necessary, the suspension can be purified by precipitating it in excessive cold water, washing the precipitate and dissolving it again in pure cosolvent mixture which is than used for casting photosensitive layers.

If pure synthetic polymers or copolymers of polyol acrylates or methacrylates are used without genuine gelatine, the photosensibility can be increased by adding known sensibilizers such as cystine, cysteine, glutathione, histidine, methionine and their oligomers or derivatives e.g. with formaldehyde, or thiourea, allyldimethyl thiourea, alkylthioureas, thiosemicarbazide and other substances having the characteristic group

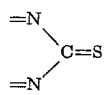

The photosensitive layers of any above-mentioned kind can be further improved by adding known sensibilizers such as erythrosine (tetraiodofluoresceine sodium), oxacarbocyanines substituted either in aromatic nuclei or in side chains, unsaturated carbocyanines, carbocyanines derived from benzothiazole or benzoselenazole and other organic dyestuffs suitable for increasing or modifying the light-sensitivity of photosensitive layers based on silver halides.

Another way for increasing the photosensitivity is to introduce groups such as -SH into the polyolacrylate or polyolmethacrylate polymers and copolymers, particularly by partly substituting hydroxylic groups using generally known methods such as the reaction with phosphorus pentasulfide.

Moreover, known wetting, preserving and other agents can be added if desired. Usual substraction and antihalo layers can be also used.

If silver halide is precipitated directly in a solution of the above said polymers and copolymers, the components—e.g. silver nitrate and hydrobromic acid or its salts—are advantageously added in solvents which do not precipitate the polymer or copolymer used. Most convenient are cosolvent mixtures identical with that used for dissolving the polymer. When using grafted gelatine mentioned above, the copolymer solution is less liable to be precipitated by aqueous solutions. In order to facilitate the dissolution, hydrohalides or their water-soluble salts can be added directly to cosolvent mixtures in which the polymer or copolymer is prepared, provided of course that there are used polymerization catalysts which do not interfere with the hydrohalide (bromide or iodide) causing the inhibition of polymerization. Such undesirable combination would be a peroxidic catalyst and bromide or iodide cation. Suitable polymerization catalyst in such cases is e.g. azo-bis-isobutyronitrile.

Viscosity of the solutions of the above-mentioned polymers is controlled by generally known rules, depending on the concentration, temperature, molecular weight and its distribution, branching degree and quality of the solvent. The forming of the film depends also, as commonly known, on the evaporation curve of the mixture. It is important to avoid premature precipitation which can occur if a less volatile constituent is poor solvent of the polymer and causes cloudiness or opacity of the film. If, however, the solubility of the polymer remains unimpaired till to the end of evaporation, the resulting film is smooth, transparent and glossy. The adhesion to the substrate film is generally better than that of the usual gelatine-based photosensitive layers.

Silver halides whenever mentioned in the specification include chloride, bromide, iodide and their mixtures. The use of other known photosensitive substances such as certain di-azo-compounds lies also within the scope of the invention.

The binding agents according to the invention, whether gelatine containing or not, can be also subsequently cross-linked by means of formaldehyde, methylglyoxal, dimethylglyoxal, di-isocyanates, chromium salts and similar. Cross-linking reduces the swelling capacity and increases the resistance against aqueous alkaline and acid solutions at increased temperatures.

The invention is illustrated by following nonlimiting examples, covering several typical embodiments thereof.

EXAMPLE 1

Grafted copolymer of ethylene glycol monomethacrylate on gelatine was prepared in following way:

Twenty g. of gelatine were dissolved in 100 ml. of a mixture of equal volumes of glycerol and water at 60° C. in a three-necked flask provided with a reflux cooler, a stirring device and a dropping funnel with scale. The flask was immersed in a heating bath. 200 ml. of a mixture ethanol-water (3:1) were gradually added while stirring and then, during 10 minutes, 20 ml. of ethylene glycol monomethacrylate, containing 0.39 percent of ethylene glycol bis-methacrylate were added, with 1 g. of dibenzoyl peroxide dispersed therein. Simultaneously the temperature was increased to 80° C. to the boiling temperature of the reaction mixture. The copolymerization was finished after 90-120 minutes. The reaction can be also performed at a lower temperature, e.g. at 60° C., but then the polymerization lasts longer and the reaction mixture is not boiling.

The reaction mixture was then poured into an excess of cold water while stirring vigorously, whereby the grafted copolymer was precipitated in the form of a fibrous mass. After one hour of washing the precipitate was brought into fresh washing water. Superfluous water was centrifugally separated and the wet mass was dissolved at 60° C. in 250 ml. of a cosolvent mixture ethanol-water, the amount of water being chosen so that the total amount thereof reached, together with water contained in the grafted copolymer, equal volume of ethanol. Wet copolymer weighed 50 g. the dry substance amounted to 21 g. Thereafter were added 50 ml. of a solution of 5 g. potassium bromide, 0.2 g. potassium iodide, 0.17 g. sodium chloride and 5 ml. of glycerol in aqueous ethanol (1:1). The solution was slightly colored by iodine, liberated from the potassium iodide by remainders of the peroxidic polymerization catalyst. Further treatment was carried out in darkness.

A solution of 6 g. of silver nitrate in 6 ml. of concentrated aqueous ammonia was added at about 30° C. and the mixture was stirred for 2 minutes. The unripe emulsion was poured on a sheet of paper provided with a baryte layer, as commonly used for manufacturing photographic papers. The layer was dried 2 hours at 25° C. in a dark room. The surface of the layer was smooth and glossy. The photosensitivity was proportional to the quality of the gelatine used: a "pro bacto" gelatine used for grafting yielded less sensitive layers than high-grade photographic gelatine.

The obtained picture was rather soft. The developing, washing and fixation was free of irregularities. In usual commercial developer (metol-hydroquinone) - the picture appeared after 30 s. and developing was finished in 1.5 minute.

Still better result was obtained when the "emulsion" was neutralized by saturated aqueous citric acid solution at 25° C.

The adhesion of the photosensitive layer at increased temperatures can be enhanced by cross-linking with formaldehyde, with a chromium salt or similar, as usual with pure gelatine layers.

EXAMPLE 2

Grafted gelatine was prepared according to example 1 with the ratio 8 g. of gelatine to 32 ml. of glycol methacrylate. The grafted copolymer was less swellable in water than that according to example 1, but it had simultaneously better solubility in cosolvent mixtures with higher proportion of an organic solvent, e.g. acetone or ethanol. The permeability for water, ions and organic substances was nevertheless very high. Further procedure and treatment was the same as in example 1, except that a cosolvent mixture water-ethanol-ethylene glycol monacetate (2:2:1) was used.

EXAMPLE 3

Thirty-six g. of glycol methacrylate of the same quality as in example 1 was grafted onto 4 g. of bone glue at equal conditions. The grafted copolymer, after having been purified by precipitation had the same properties as similar copolymer prepared from pure gelatine. As a result of a lower protein content, the grafted copolymer was better soluble in cosolvent mixtures with higher content of organic solvents than the products obtained in foregoing examples. The photosensitivity of the layer was somewhat lower than that of the above said products.

EXAMPLE 4

Twenty g. of ethylene glycol monoacrylate, containing 0.5 percent of the corresponding diacrylate, were copolymerized with 2 g. of acrylonitrile in a mixture of 50 g. of water and 50 g. of ethanol. 0.2 g. of potassium persulfate was added and the polymerization was carried out under oxygen free nitrogen at 50° C. while stirring. The copolymer was purified by precipitation of the filtered solution in a tenfold excess of cold water and dissolved again in a cosolvent mixture water-ethanol-ethylene glycol (equal volumes). Alkali metal halide solution mentioned in example 1 was added and silver halide was precipitated in darkness by an equivalent amount of silver nitrate dissolved in aqueous ammonia. The suspension thus obtained was slowly mixed for 30 minutes at 30° C., neutralized with a concentrated aqueous citric acid solution, precipitated in cold water and the swollen precipitate made free of excessive water by centrifuging. Then it was dissolved in a solution water-ethanol-ethylene glycol monomethylether (3:3:1) and a photosensitive layer was cast onto a glass plate provided with usual antihalo layer. After having been dried in dust-free atmosphere the plate could be used in printing technique.

EXAMPLE 5

The process according to example 4 was repeated with the difference that a copolymer of 20 g. of ethylene glycol monomethacrylate, 5 g. of diethylene glycol monomethacrylate and 3 g. of acrylamide was prepared. It was more swellable in water than the copolymer used in example 4. Further treatment was equal as in example 4. The photosensitive layer was finally cross-linked with formaldehyde.

EXAMPLE 6

Twenty g. of ethylene glycol monomethacrylate, containing 0.3 percent of ethylene glycol dimethacrylate was polymerized in 100 g. of dimethylformamide using ammonium persulfate (0.1 percent on the monomer) and dimethylaminoethyl acetate (0.4 percent on the monomer) as polymerization catalyst at 20° C. The solution was purified by precipitating in a tenfold excess of cold water, excessive water removed by centrifuging and the swollen polymer dissolved in 200 g. of a mixture of water, ethanol and glycerol (3:3:1). 0.1 percent of thiosemicarbazide (on the polymer) was added and the solution was used for preparing a photosensitive layer by the method described in example 1. The paper thus obtained could be used for printing.

Whenever in the foregoing examples and general specification parts or percent values are indicated, they are to be understood by weight, if not stated otherwise.

What we claim is:

1. Photosensitive layer consisting essentially of a hydrophilic polymer or copolymer of an aliphatic polyol ester of an alpha, beta-unsaturated acid selected from the group consisting of acrylic and methacrylic acid, and a silver halide dispersed therein.

2. Photosensitive layer as set forth in claim 1, wherein the aliphatic polyol is ethylene glycol.

3. Photosensitive layer as set forth in claim 1, wherein the aliphatic polyol is di-ethylene glycol.

4. Photosensitive layer as set forth in claim 1, wherein the copolymer is ethylene glycol monomethacrylate grafted on gelatine.

5. Photosensitive layer as set forth in claim 1, wherein the copolymer is ethylene glycol monoacrylate grafted on gelatine.

6. Photosensitive layer as set forth in claim 1, wherein the copolymer consists essentially of ethylene glycol monomethacrylate and acrylamide units.

* * * * *